（12）United States Patent
Miller

(10) Patent No.: US 6,457,673 B1
(45) Date of Patent: Oct. 1, 2002

(54) MOBILE AIRCRAFT LAUNCHER

(75) Inventor: Steve Miller, Cockeysville, MD (US)

(73) Assignee: AAI Corporation, Hunt Valley, MD (US)

( * ) Notice: Subject to any disclaimer, the term of this patent is extended or adjusted under 35 U.S.C. 154(b) by 32 days.

(21) Appl. No.: 09/639,159

(22) Filed: Aug. 16, 2000

(51) Int. Cl.⁷ ................................................ B64F 1/04
(52) U.S. Cl. ..................................................... 244/63
(58) Field of Search ............................ 244/63; 124/61; 446/429, 430

(56) References Cited

U.S. PATENT DOCUMENTS

| | | | |
|---|---|---|---|
| 2,292,374 A | * 8/1942 | Hagenbuch | 244/63 |
| 2,843,342 A | 7/1958 | Ward | |
| 3,968,947 A | 7/1976 | Schlegel et al. | 244/110 C |
| 4,014,246 A | 3/1977 | Nissley et al. | 244/63 X |
| 4,079,901 A | 3/1978 | Mayhew et al. | 244/63 |
| 4,147,317 A | 4/1979 | Mayhew et al. | 244/116 |
| 4,231,535 A | 11/1980 | Schelegel et al. | 244/63 |
| 4,238,093 A | * 12/1980 | Siegel et al. | 244/63 |
| 4,279,195 A | 7/1981 | Miller | 244/63 X |
| 4,678,143 A | 7/1987 | Griffin | 244/63 |
| 4,909,458 A | 3/1990 | Martin | 244/63 |
| 5,695,153 A | 12/1997 | Britton et al. | 244/63 |

FOREIGN PATENT DOCUMENTS

| | | | |
|---|---|---|---|
| FR | 2 780 381 A | 12/1999 | |
| GB | 2 173 745 A | 10/1986 | |
| RU | SU 1774155 A1 | 11/1992 | |

OTHER PUBLICATIONS

"Pneumatic RPV Launcher", OKT Norge AS, 4 pages.
"Aerial Targets", Continental RPVs, 4 pages.
"Airscrew Howden Limited", Frazer–Nash Defence Systems Division, 2 pages.
"Remotely Piloted Vehicle Launcher", 1 page.
Photographs from Model HPL 3001 UAV Launcher, AAE P/N 33850–1 (5 sheets).
Launcher Assembly, Model HPL–3001, SM–650, pp. 5–3 to 5–34.

* cited by examiner

Primary Examiner—Robert P. Swiatek
(74) Attorney, Agent, or Firm—Venable; John B. Shannon; Jeffri A. Kaminski

(57) ABSTRACT

A mobile aircraft launcher includes a towable, tiltable, wheeled trailer, a launch beam comprising a plurality of sections hinged to one another, an aircraft-engaging shuttle mounted on the launch beam, and a shuttle-moving drive arrangement mounted on the trailer. The launch beam is mounted on the trailer and is movable between a folded, transport condition, in which the beam sections are generally side-by-side, and a launch condition, in which the beam sections are colinear. In the colinear arrangement, a portion of the launch beam extends forward of the trailer, that portion being supportable entirely through the trailer.

15 Claims, 10 Drawing Sheets

MOBILE AIRCRAFT LAUNCHER

The present invention relates to launchers for aircraft and, more particularly, to compact lightweight mobile aircraft launchers capable of quick setup.

BACKGROUND OF THE INVENTION

Mobile launchers are known for launching lightweight aircraft, especially unmanned aircraft, but have the drawback of being too large and heavy and too slow or difficult to set up for launch.

SUMMARY OF THE INVENTION

By the present invention, an exceptionally lightweight and compact mobile aircraft launcher comprises a trailer which can be towed by a lightweight vehicle, such as the Hgh Mobility Multipurpose Wheeled Vehicle (HMMWV). The launcher is capable of launching aircraft having weights of as much as 400 pounds or more. The launcher can be quickly and easily changed from a folded, transporting condition to a deployed, launching condition at a level attitude by one person.

The structure which gives the aircraft launcher of the present invention the foregoing advantages includes a launch beam having multiple beam sections hinged to one another. When deployed for launch, one beam section remains fixed to the trailer, while another beam section folds forward and two other beam sections fold rearward. Jacks provided at the leading and trailing ends of the trailer support the trailer and the launch beam at the proper attitudes for transport, deployment and launch. The jacks are retractable for transporting the trailer and are adjustable to move the trailer between the proper attitudes for deployment and the proper attitude for launch. Beam sections are secured on the trailer in their folded positions by stowage straps.

The jacks are adjustable in height to change the attitude at which they support the trailer and the launch beam. For deployment of the launch beam, the jacks are adjusted to support the launch beam in a horizontal attitude so that the beam sections can be pivoted about their hinges without gravity tending to make them swing or increasing the force needed to pivot them. After the beam sections have been pivoted to their colinear positions and locked there, the jacks are adjusted to support the launch beam in an inclined attitude (approximately 10 degrees) for launch. When the launch beam is in a horizontal attitude, the launch beam is no more than about 5 feet above a ground surface supporting the trailer so that the beam sections can be pivoted by a person standing on the ground surface.

An electrical power unit including gel cell batteries and a charging system is mounted on the trailer for powering an aircraft starter, providing ground power for the UAV and powering the trailer mounted hydraulic system. The trailer mounted hydraulic system consists of a fluid reservoir, control valves, a launch cylinder with integrated accumulator, a latch release cylinder, a nitrogen tank and an electrically driven hydraulic pump. Equipment for arresting a landing aircraft is releasably secured to the trailer, the arresting equipment including an arresting pendant to extend across a runway, energy absorbers to which ends of the pendant are connected, stakes to hold the absorbers in place, and a sledge hammer for driving and removing the stakes.

DETAILED DESCRIPTION OF THE PREFERRED EMBODIMENTS

Figure 1:
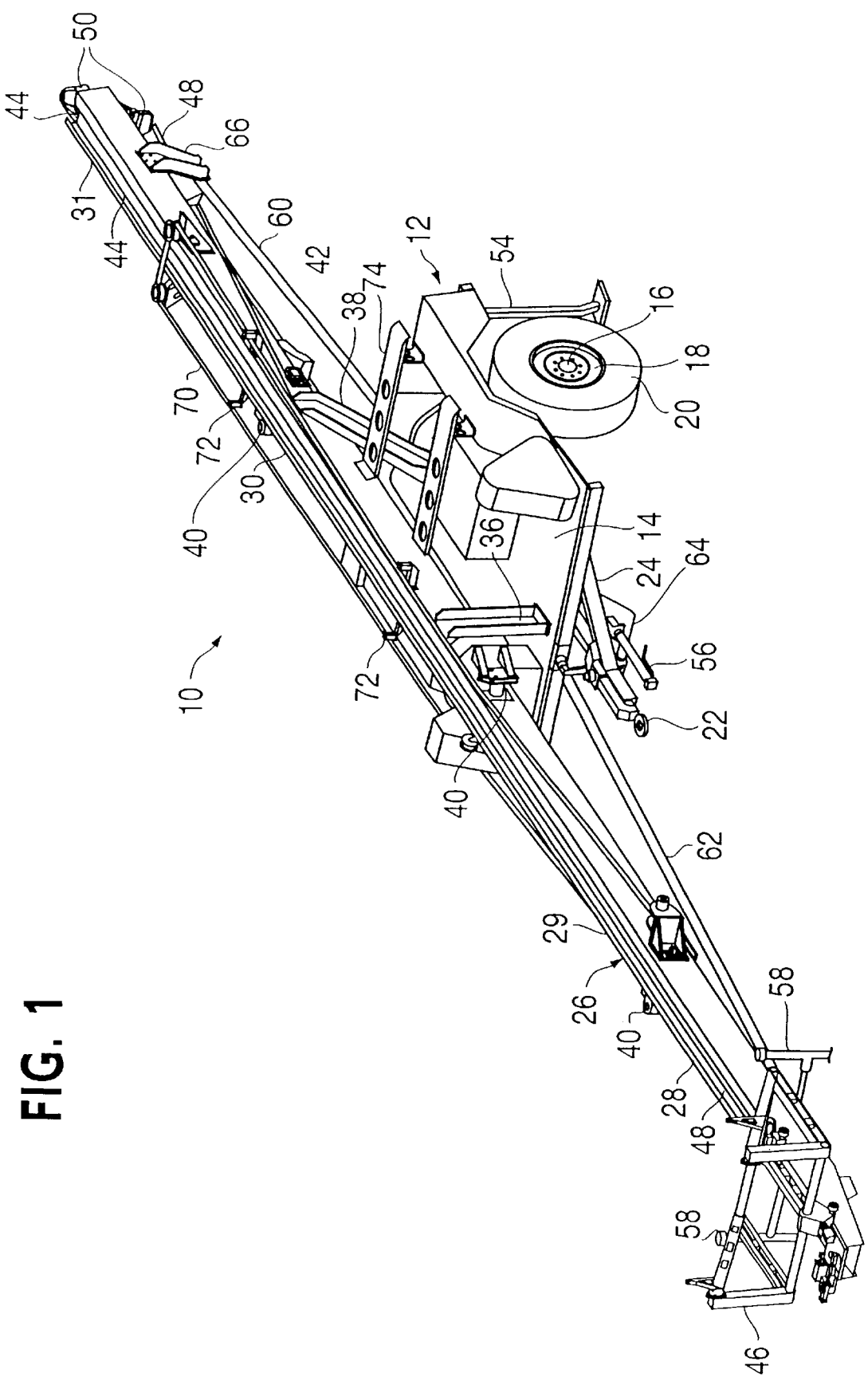
FIG. 1 is a perspective view of the aircraft launcher of the present invention in a launch position.
Figure 2:
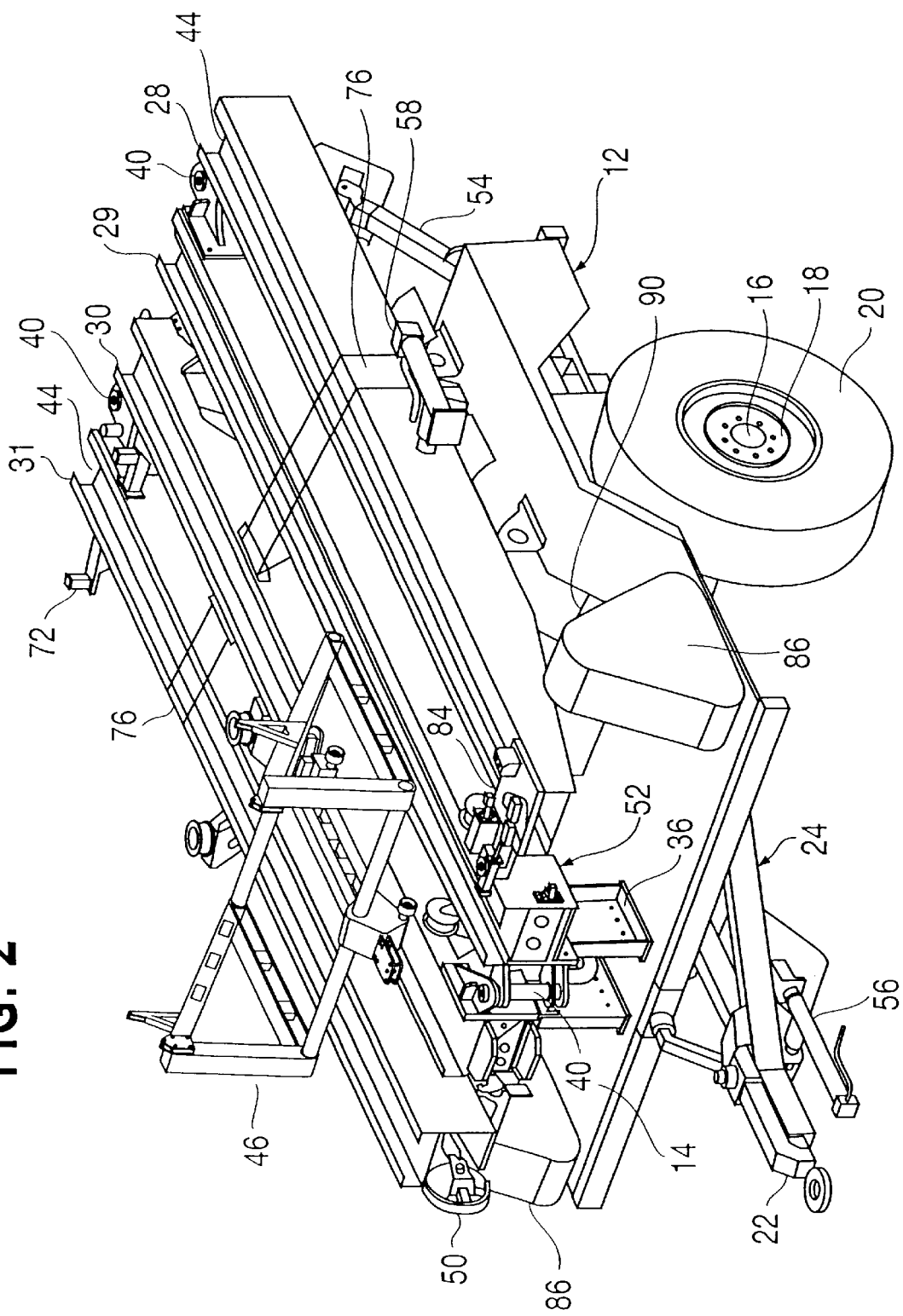
FIG. 2 is an enlarged perspective view of the aircraft launcher of FIG. 1 in a folded position.

As can be seen from FIGS. 1 and 2, the mobile aircraft launcher according to the present invention, which is designated generally by the reference numeral 10, comprises a trailer 12 towable by a lightweight vehicle, such as an HMMWV. The trailer 12 includes a trailer bed 14, a single wheel axle 16, and wheels 18 and tires 20 mounted at opposite ends of the axle. A conventional trailer hitch 22 extends from one end of a frame 24 supporting the trailer bed 14 for connection to a towing vehicle.

A launch beam 26 comprising a plurality of beam sections 28, 29, 30 and 31 is mounted above the trailer bed 14 by a plurality of supports 36 and 38. The beam sections 28–31 include a rearmost beam section 28, a rear intermediate beam section 29, a forward intermediate beam section 30 and a forwardmost beam section 31. "Forward" and "rearward" as used herein are with respect to direction of launch of the aircraft. They are opposite of the terms "forward" and "rearward" with respect to the direction of the trailer 12 when the trailer is being towed. The forward intermediate beam section 30 is secured to the beam supports 36 and 38. The other beam sections 28, 29 and 31 are not secured directly to the beam supports 36 and 38, but rather are connected to one another by hinge connections. More specifically, the forwardmost beam section 31 is connected by a hinge 40 to a forward end of the forward intermediate beam section 30; the rear intermediate beam section 30 is connected by a hinge 40 to the rear end of the forward intermediate beam section 29; and the rearmost beam section is connected by a hinge 40 to the rear end of the rear intermediate beam section 29. Each of the hinges 40 is arranged such that the beam sections 28–31 pivot about generally vertical hinge axes. Over-the-center latch devices 42 of a conventional type are provided at the hinge connections to secure the launch beam sections in a colinear arrangement defining the rectilinear launch beam. The beam sections 28–31 are shown in greater detail in FIGS. 3–6.

Figure 7:
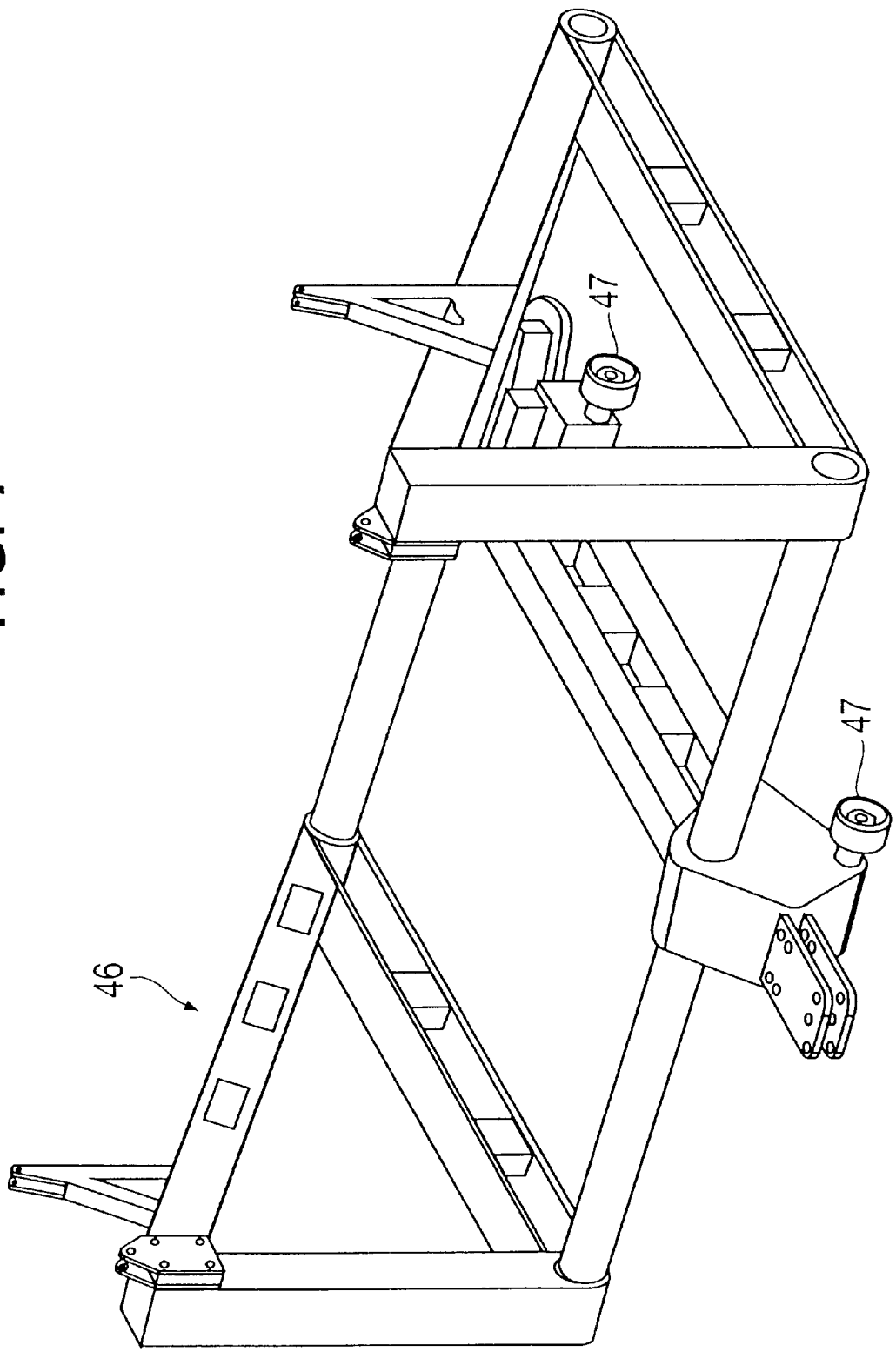
FIG. 7 is an enlarged perspective view of the aircraft-engaging shuttle of the aircraft launcher of FIG. 1.

The launch beam 26 defines a slot 44 in its upper surface to receive a shuttle 46 for movement along the launch beam, the shuttle having wheels 47 (FIG. 7) captured between horizontal flanges of the launch beam. The shuttle 46 is connected to a cable 48 extending around sheaves 50 in a conventional revving manner, an opposite end of the cable 48 being attached to a 5 to 1 cable revving system assembly.

Sliding sleeves of the revving system are connected to a hydraulic cylinder assembly 82, which provides the driving force for the shuttle. The shuttle 46 supports the fuselage of the aircraft and engages under and behind the wings to catapult the aircraft forward under the power of a hydraulic/pneumatic assembly 52.

Two front jacks 54 (one of which is shown) are secured to the front end of the trailer 12 at opposite corners, the jacks being pivotally connected to the trailer at the top of the jacks and being movable between a deployed position, as in (FIG. 2), in which the jacks contact a ground surface, and a retracted, or stowed, position, in which the jacks are clear of the ground surface. A rear jack 56, pivotally connected to the trailer at a rear end of the trailer, is shown stowed in FIGS. 1 and 2. The front jacks 54 and the rear jack 56, which are all of a conventional type, are all adjustable for height, so that the trailer 12 can be tilted and supported about the single wheel axle 16.

Figure 3:
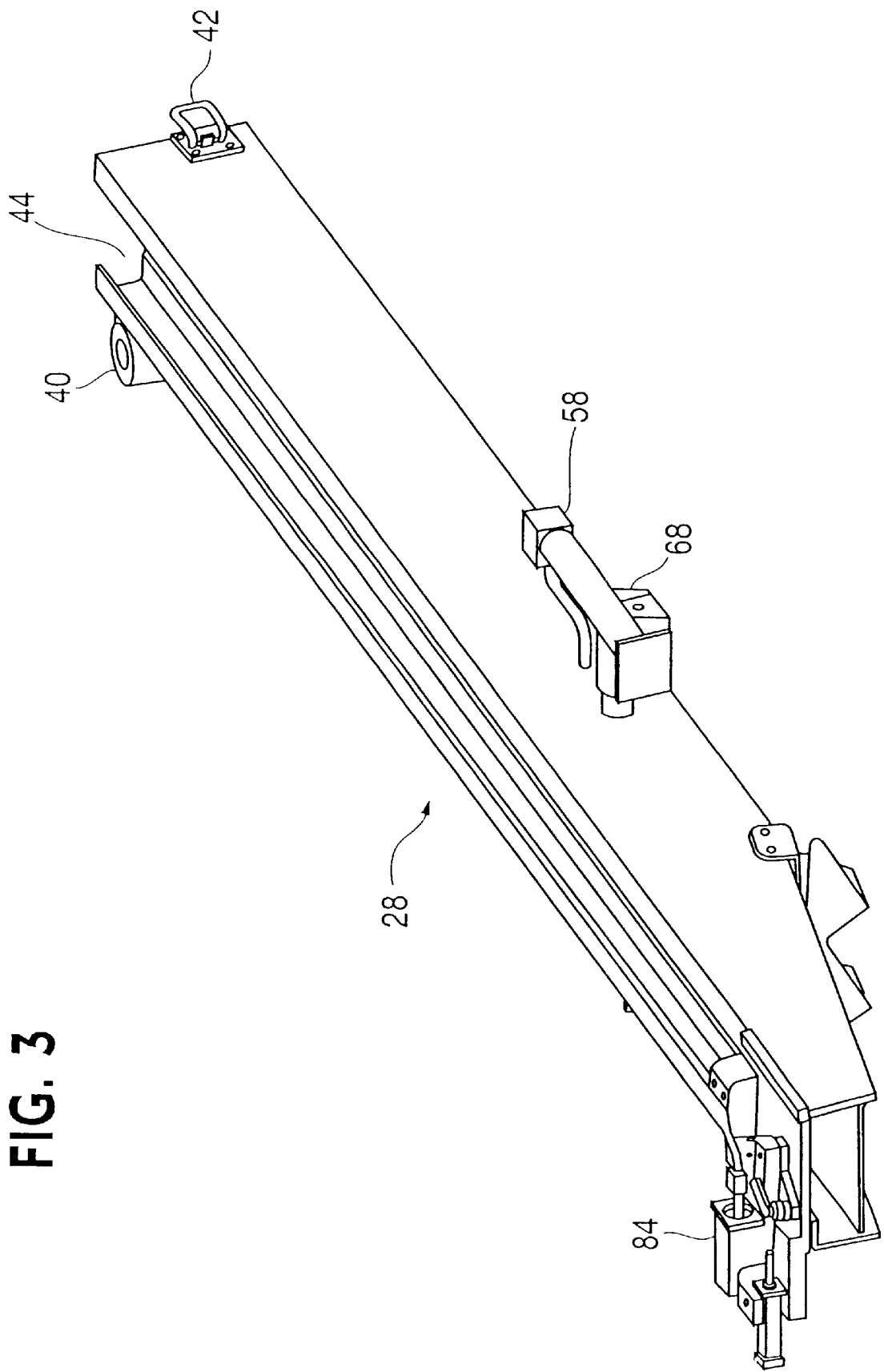
FIG. 3 is an enlarged perspective view of a rearmost beam section of the aircraft launcher of FIG. 1.
Figure 4:
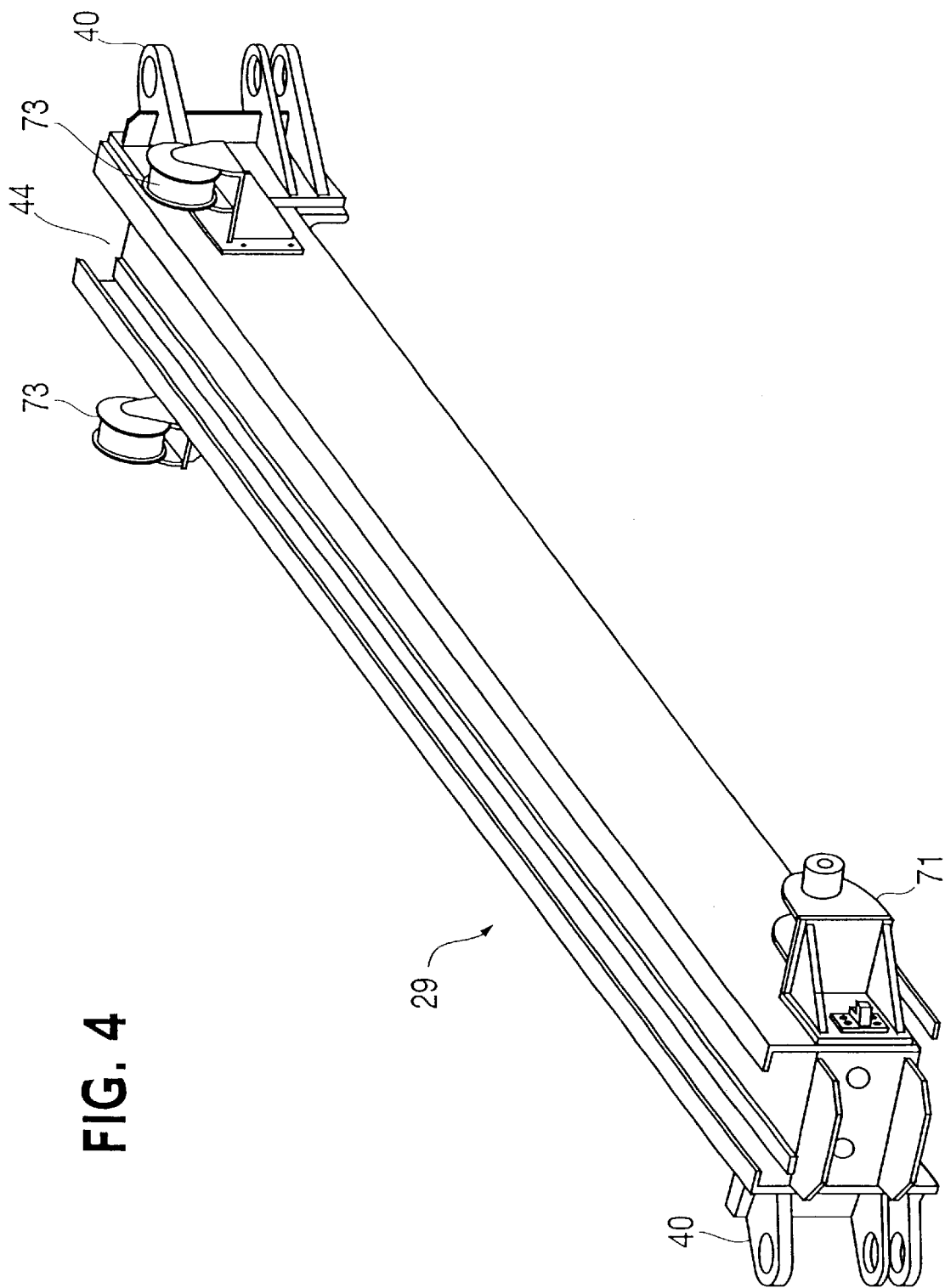
FIG. 4 is an enlarged perspective view of a rear intermediate beam section of the aircraft launcher of FIG. 1.
Figure 5:
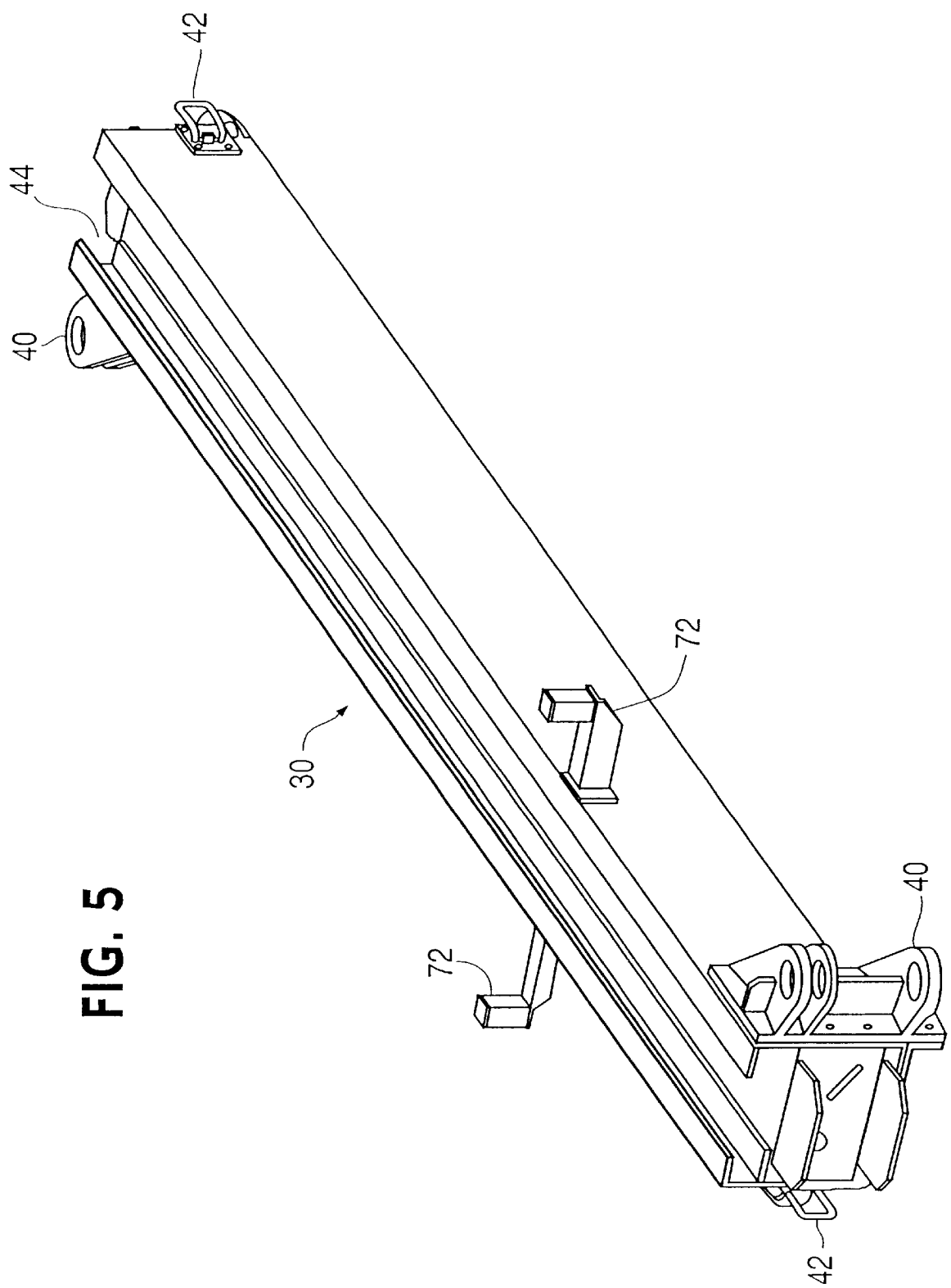
FIG. 5 is an enlarged perspective view of a forward intermediate beam section of the aircraft launcher of FIG. 1.
Figure 6:
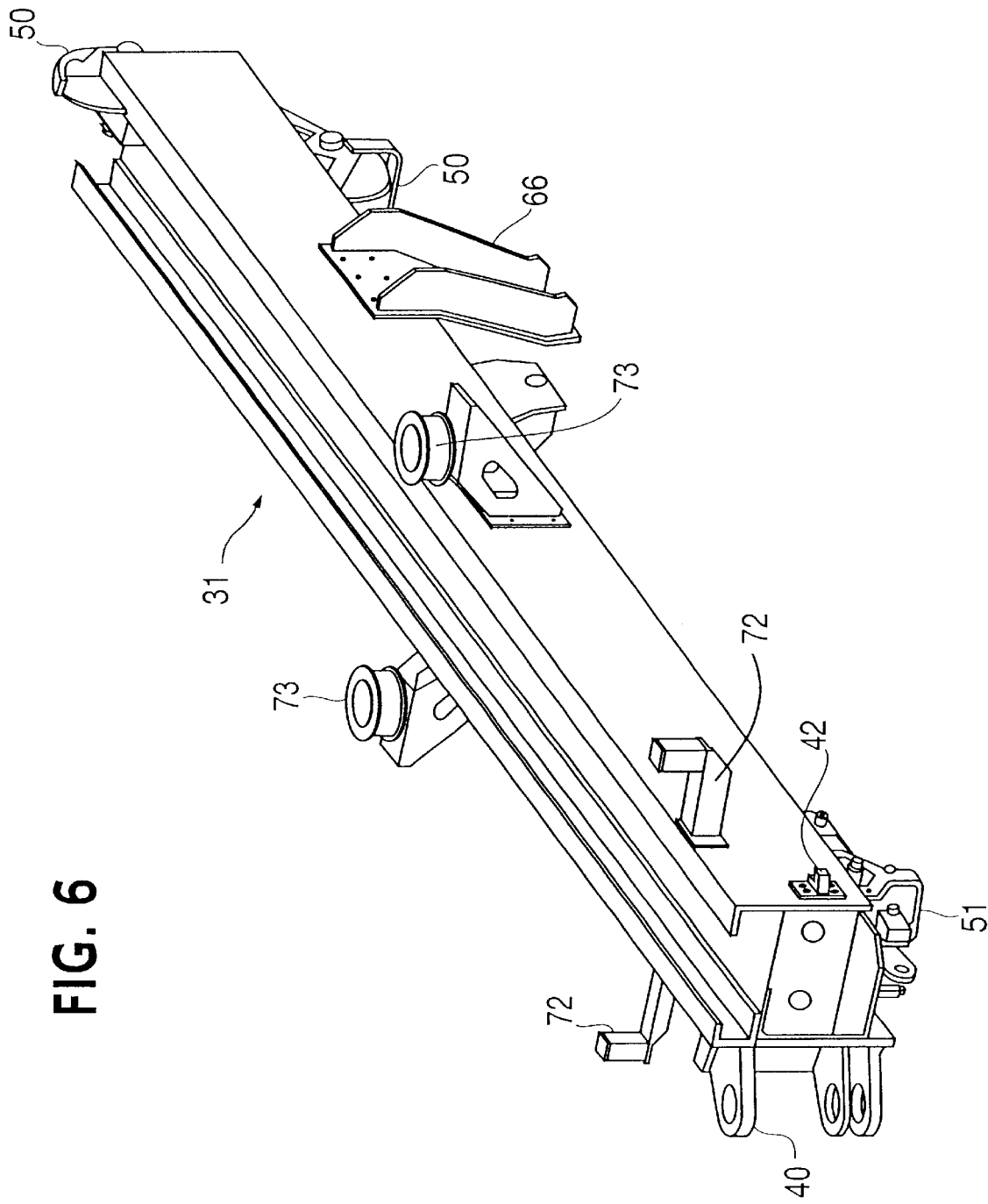
FIG. 6 is a enlarged perspective view of a forwardmost beam section of the aircraft launcher of FIG. 1.

Adjustable launch beam jacks 58 are mounted at the rear of the launch beam 26 and are moveable between a stowed position, as in FIG. 3, and a deployed position, as in FIG. 1, in which the launch beam jacks support the launch beam in its inclined, launch position. A forward support strut 60 and a rearward support strut 62 extend from brackets 64 secured on the trailer 12 to, respectively, brackets 66 and 68 (FIG. 3) secured to the launch beam 26, where the struts are releasably connected by, for example, pins (with detent balls) extending through aligned apertures. In the transport condition of the launcher 10, the support struts 60 and 62 are positioned in two of the beam sections 28–31, in the slot 44.

A shuttle brake strap 70 of conventional design has one end secured in a brake strap tension mechanism 71 (FIG. 4) anchored to the launch beam 26, the shuttle brake strap being guided by guides 72 and pulleys 73 (FIGS. 4 and 6) and extending across the path of the shuttle 46 near the forward end of the launch beam to decelerate and stop the shuttle 46 after the launch of the aircraft.

In the folded position shown in FIG. 2, the beam sections 28–31 are shown in a folded, side-by-side arrangement in which opposite ends of each beam section lie in substantially the same vertical planes as the opposite ends of each of the other beam sections. As a result, the overall length of the launcher 10 in the folded position is minimized. As can best be seen from FIGS. 1 and 8, tie-down supports 74 extend horizontally and transversely across the trailer 12 to support the beam sections 28, 29 and 31 in their folded positions. Straps, 76 such as conventional cargo straps, are secured to the forward intermediate beam section 30 to maintain the other beam sections in their folded positions. The trailer lunette 22 extends beyond the ends of the beam sections 28–31 and all other portions of the launcher 10 to facilitate connection of the launcher 10 to a towing vehicle.

Figure 8:
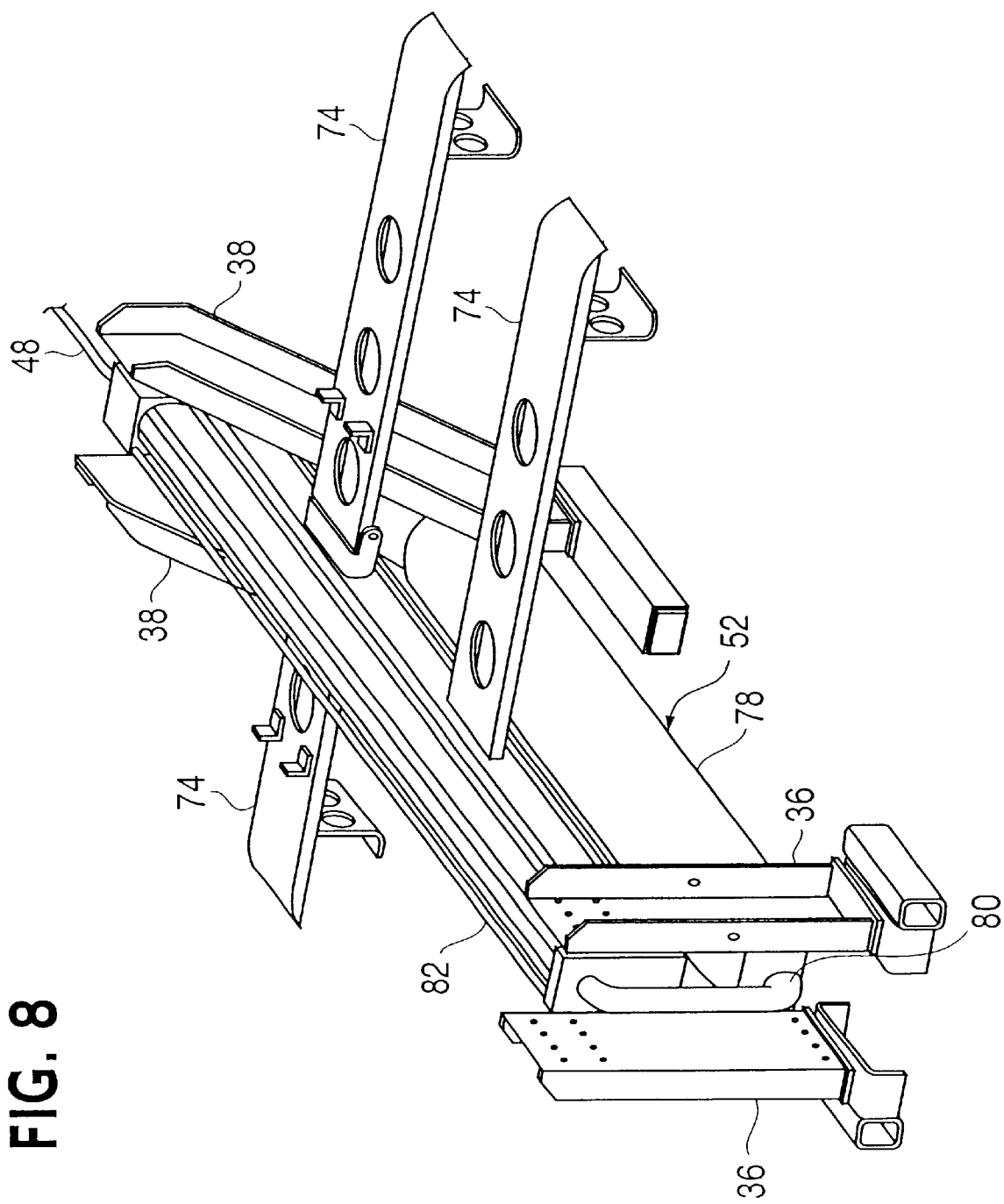
FIG. 8 is an enlarged perspective view of the hydraulic-pneumatic assembly of the aircraft launcher of FIG. 1.

It can be seen from FIG. 8 that the hydraulic/pneumatic assembly 52 includes a tank 78 for compressed nitrogen or other gas connected by a pipe 80 to an actuator/accumulator 82 which contains a piston to provide a driving force for the cable 48 pulling the shuttle. The hydraulic/pneumatic assembly 52 is mounted on the trailer bed 14 among the beam supports 36 and 38 and under the tie down supports 74. When the launch beam 26 has been deployed and the aircraft positioned on shuttle 46, the shuttle is held at the rear of the launch beam by a release mechanism. In this condition, hydraulic oil is pumped into the actuator/accumulator 82 to tension the cable 48. This action causes the separator piston in the actuator/accumulator to move to energize the gas stored in tank 78. In order to launch the aircraft, the shuttle release mechanism 84 is actuated.

Figure 9:
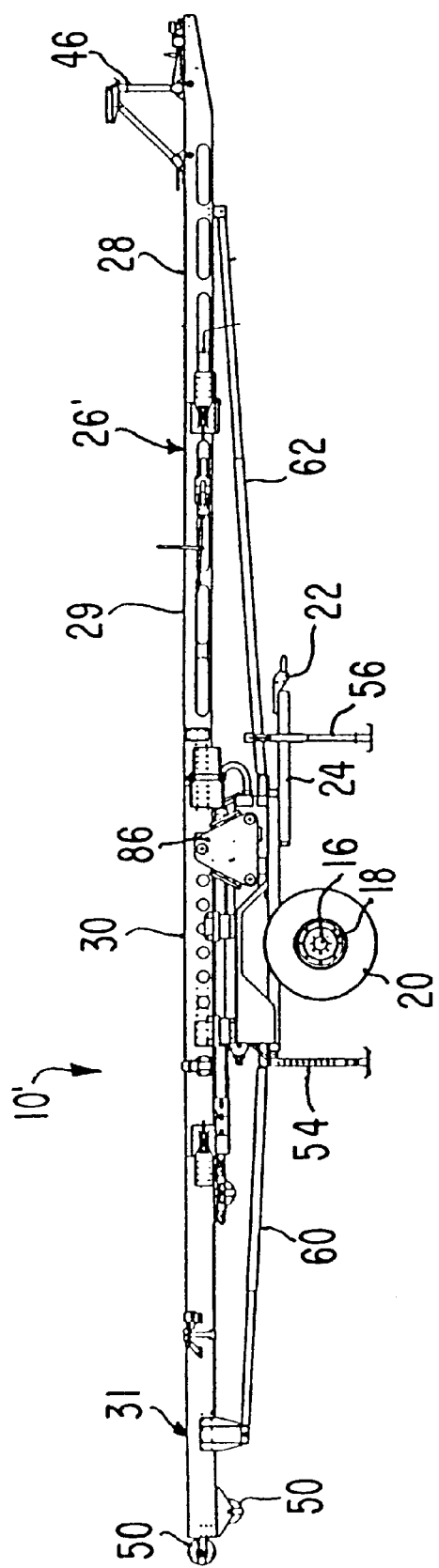
FIG. 9 is a side elevation of an alternate embodiment of the aircraft launcher of the present invention in a horizontal attitude.
Figure 10:
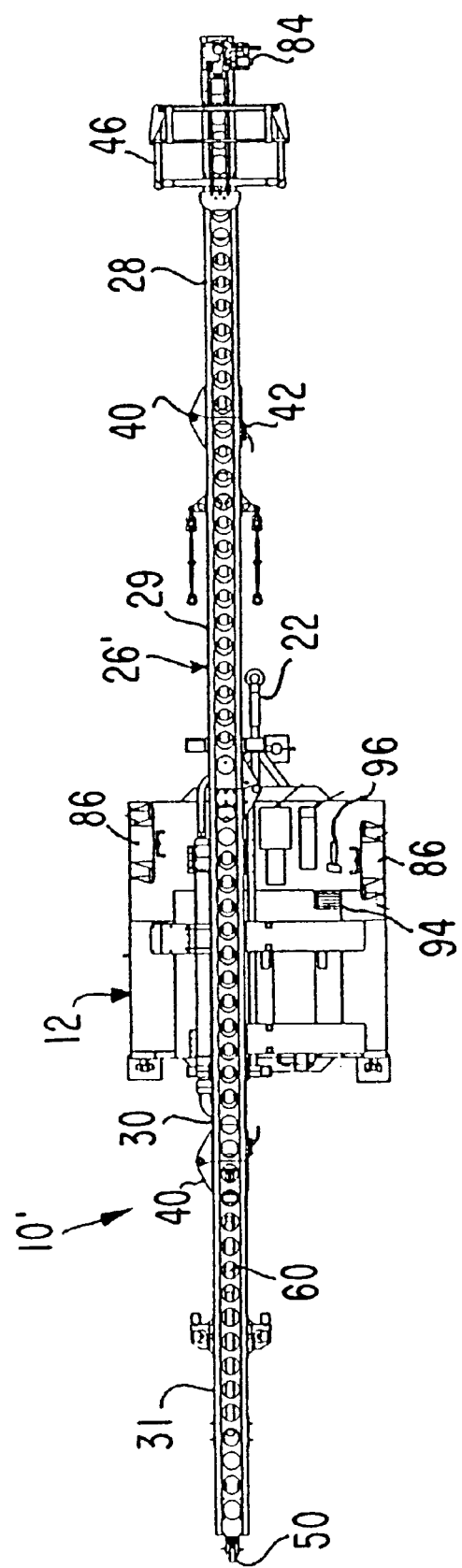
FIG. 10 is a top plan view of the aircraft launcher of FIG. 9.

Although no showing is made for the embodiment of FIGS. 1–8 of the launch beam in an extended position at a horizontal attitude, such a showing is made in FIG. 9 for an alternative preferred embodiment. The alternate preferred embodiment shown in FIGS. 9 and 10 may show additional details not indicated in FIGS. 1–8. The extended position at horizontal attitude and the details in FIGS. 1–8 are the same as those shown in FIGS. 9 and 10, unless they are specifically indicated to be different in FIGS. 1–8. The most significant difference between the embodiment of FIGS. 1 and 8 and the embodiment of FIGS. 9 and 10 is that the launch beam 26' of the embodiments of FIGS. 9 and 10 is perforated to further decrease the weight of the launcher 10'.

In moving the launcher 10 from a folded, transport position, such as that shown in FIG. 2, to an extended position, such as that shown in FIG. 9, the front jacks 54 and the rear jack 56 front jacks are deployed and adjusted to orient the beam sections 28–31 at a horizontal attitude. In the horizontal attitude, the beam sections 28–31 are no more than about five feet above the ground surface supporting the trailer 12. The horizontal attitude and the height limitation of about five feet facilitate the movement of the beam sections between the folded position and the extended position. Limiting the height of the beam sections in the horizontal attitude makes it relatively easy for one person to pivot the beam sections about their pivot axes while standing on the ground. The horizontal attitude eliminates the tendency of the beam sections to swing about their pivot axes under the influence of gravity. Such a tendency is a danger where the beam sections are inclined at the time of folding or extending, especially in view of their significant weight. The beam sections and most other parts of the launcher are ordinarily made of aluminum and steel.

Additional equipment is mounted on the trailer 12 to make the launcher 10 self-sufficient for launching and retrieving operations. The additional equipment includes energy absorbers 86 releasably secured to the trailer 12 by any of a number of conventional arrangements. As can be seen from FIGS. 1 and 2, the energy absorbers 86 include housings defining horizontal apertures. Pins extending horizontally from a bracket mounted on the trailer 12 are received in the horizontal apertures of the absorber housings. The pins have transverse openings at their outer ends, and ball-detent pins 88 attached to the trailer by lanyards 90 are releasably received in the transverse openings. A pendant for extending across a runway is held in a container on the trailer 12, and stakes 94 and a sledgehammer 96, best seen in FIG. 10, are releasably secured to the trailer by resilient straps, or other conventional arrangements.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

What is claimed is:

1. A mobile aircraft launcher comprising:
   a wheeled trailer adapted to be towed by a land vehicle and to be tilted to launch an aircraft;
   a launch beam mounted on the trailer, the launch beam comprising a plurality of beam sections hinged to one another, the launch beam being movable between a folded, transport condition, in which the beam sections are generally side-by-side, and a launch condition, in which the beam sections are colinear to define a continuous rectilinear beam;

an aircraft-engaging shuttle mounted on the launch beam for movement along the length of the launch beam;

a shuttle-moving drive arrangement mounted on the trailer; and at least one jack secured to the trailer and adjustable between a) a first adjustment condition, in which the jack supports the launch beam in a horizontal attitude to facilitate the movement of the launch beam between its folded, transport condition and its launch condition, and b) a second adjustment condition, in which the wheeled trailer tilts, and the launch beam is in an inclined position for launch, wherein the launch beam has a portion extending forward of the trailer with respect to the direction of launch when the beam sections are colinear, said portion being supportable entirely through the trailer when the beam sections are colinear.

2. The mobile aircraft launcher of claim 1, wherein the at least one jack is mounted on a rearward end of the trailer with respect to the direction of launch.

3. The mobile aircraft launcher of claim 2, further comprising a jack mounted on a forward end of the trailer with respect to the direction of launch.

4. The mobile aircraft launcher of claim 1, wherein the at least one jack is movable between a first position, in which the at least one jack is in contact with a ground surface supporting the trailer, and a second, retracted position, in which the at least one jack is clear of the ground surface.

5. The mobile aircraft launcher of claim 1, further comprising a towing member secured to and extending from the trailer for connection to a towing vehicle, the towing member extending farther from the trailer than the beam sections extend from the trailer in the folded, transport condition of the launch beam.

6. The mobile aircraft launcher of claim 1, further comprising means for releasably maintaining the beam sections in their generally side-by-side condition.

7. The mobile aircraft launcher of claim 1, wherein each of the beam sections has opposite ends, the ends of each of the beam sections, in the folded, transport condition of the launch beam, lying in substantially the same vertical plane as the ends of the other beam sections.

8. The mobile aircraft launcher of claim 7, wherein the launch beam comprises four beam sections.

9. The mobile aircraft launcher of claim 1, wherein the trailer has a single wheel axle, the trailer being tiltable about the single wheel axle.

10. The mobile aircraft launcher of claim 1, further comprising at least one launch beam jack for supporting a rear end of the launch beam in the inclined position for launch, the launch beam jack being releasably mounted on the trailer during transport of the launcher.

11. The mobile aircraft launcher of claim 1, wherein, in the horizontal attitude of the launch beam, the launch beam is no more than about 5 feet above a ground surface supporting the trailer.

12. A mobile aircraft launcher, comprising:

a wheeled trailer adapted to be towed by a land vehicle and to be tilted to launch an aircraft;

a launch beam mounted on the trailer, the launch beam comprising a plurality of beam sections hinged to one another, the launch beam being movable between a folded, transport condition, in which the beam sections are generally side-by-side, and a launch condition, in which the beam sections are colinear to define a continuous rectilinear beam;

an aircraft-engaging shuttle mounted on the launch beam for movement along the length of the launch beam;

a shuttle-moving drive arrangement mounted on the trailer; and means secured to the trailer for selectively a) supporting the launch beam in a horizontal attitude to facilitate the movement of the launch beam between its folded, transport condition and its launch condition, and b) permitting the launch beam to move to an inclined position for launch, wherein the launch beam has a portion extending forward of the trailer with respect to the direction of launch when the beam sections are colinear, said portion being supportable entirely through the trailer when the beam sections are colinear.

13. The mobile aircraft launcher of claim 12, wherein the trailer has a single wheel axle, the trailer being tiltable about the single wheel axle.

14. A method of deploying from a folded, transport condition to a launch condition a mobile aircraft launcher having a launch beam defined by a plurality of beam sections hinged to one another, the beam sections being generally side-by-side in the folded, transport condition, and the beam sections being colinear to define a continuous rectilinear beam in the launch condition;

an aircraft-engaging shuttle mounted on the launch beam for movement along the length of the launch beam; and a shuttle-moving drive arrangement, the method comprising:

supporting the launch beam in a horizontal attitude;

pivoting the beam sections relative to one another from their generally side-by-side positions to their colinear positions in which a portion of the launch beam extends forward of the trailer with respect to the direction of launch while the launch beam is supported in the horizontal attitude;

during the step of pivoting, supporting said portion of the launch beam entirely through the trailer; and moving the launch beam to an inclined position for launch.

15. The method of claim 14, further comprising securing the beam sections in their colinear positions while the launch beam is supported in the horizontal attitude.

* * * * *